United States Patent
Tonegawa

(10) Patent No.: US 10,223,048 B2
(45) Date of Patent: Mar. 5, 2019

(54) IMAGE FORMING APPARATUS USING CLOUD SERVICES, IMAGE COMMUNICATION METHOD THEREFOR, AND STORAGE MEDIUM

(71) Applicant: CANON KABUSHIKI KAISHA, Tokyo (JP)

(72) Inventor: Nobuyuki Tonegawa, Kashiwa (JP)

(73) Assignee: CANON KABUSHIKI KAISHA, Tokyo (JP)

( * ) Notice: Subject to any disclaimer, the term of this patent is extended or adjusted under 35 U.S.C. 154(b) by 0 days.

(21) Appl. No.: 15/712,558

(22) Filed: Sep. 22, 2017

(65) Prior Publication Data
US 2018/0088879 A1 Mar. 29, 2018

(30) Foreign Application Priority Data
Sep. 28, 2016 (JP) ................................ 2016-189767

(51) Int. Cl.
*H04N 1/00* (2006.01)
*G06F 3/12* (2006.01)
*G06F 21/60* (2013.01)
*H04L 29/06* (2006.01)

(52) U.S. Cl.
CPC .......... *G06F 3/1238* (2013.01); *G06F 3/1204* (2013.01); *G06F 3/1205* (2013.01); *G06F 21/608* (2013.01); *H04L 63/0428* (2013.01); *H04L 63/083* (2013.01); *H04L 63/0853* (2013.01)

(58) Field of Classification Search
USPC ................................. 358/1.1–3.29, 1.11–1.18
See application file for complete search history.

(56) References Cited

U.S. PATENT DOCUMENTS

| 9,727,283 | B2 | 8/2017 | Iwasaki et al. | |
| 2006/0069918 | A1* | 3/2006 | Takahashi | G06F 21/40 713/176 |
| 2007/0038706 | A1* | 2/2007 | Karamchedu | G06F 19/322 709/206 |
| 2009/0322115 | A1* | 12/2009 | Yamada | B60N 2/06 296/65.08 |

(Continued)

FOREIGN PATENT DOCUMENTS

JP 2014197819 A 10/2014
JP 2015118533 A 6/2015

*Primary Examiner* — Marcellus Augustin
(74) *Attorney, Agent, or Firm* — Rossi, Kimms & McDowell LLP

(57) ABSTRACT

An image forming apparatus which eliminates a need for a user to operate a mobile terminal each time he or she sends an image file from the image forming apparatus using a cloud service and therefore enhances ease of operation. First user authentication of the user is performed for the image forming apparatus. Image data read from a scanner is converted to an image file, which in turn is sent to a destination set on a transmission destination setting screen. Based on the authenticated user, an access token to be used is selected from at least one access token managed in a hard disk of the image forming apparatus so as to use a function of an external server. Second user authentication for the external server is performed using the selected access token. After that, the image file is sent using the function of the external server.

9 Claims, 11 Drawing Sheets

(56) References Cited

U.S. PATENT DOCUMENTS

| | | | | |
|---|---|---|---|---|
| 2013/0308154 A1* | 11/2013 | Kawashima | ....... | H04N 1/00856 358/1.14 |
| 2014/0362404 A1* | 12/2014 | Miyasaka | ............. | G06F 3/1222 358/1.15 |
| 2015/0143488 A1* | 5/2015 | Takehara | ................ | H04L 63/08 726/6 |
| 2015/0237043 A1* | 8/2015 | Nishi | .................. | H04L 63/0853 726/9 |
| 2016/0094541 A1* | 3/2016 | Tan | .................... | G06F 21/6218 713/156 |
| 2016/0182762 A1* | 6/2016 | Eum | .................... | H04N 1/4413 358/1.14 |

* cited by examiner

200 http://172.24.10.10/rui/filesend.html

FILE    EDIT    VIEW    FAVORITES    TOOLS

210 — ADDRESS BOOK FILE DESTINATION

211 — PROTOCOL    SMB

212 — OAuth 2.0    ON

213 — HOST NAME

214 — FOLDER PATH

215 — USER NAME

216 — PASSWORD

ADDRESS BOOK

| INDEX ID (480) | PROTOCOL (231) | OAuth ON/OFF (232) | HOST NAME (233) | FOLDER PATH (234) | USER NAME (235) | PASS-WORD (236) | ACCESS TOKEN ID (481) |
|---|---|---|---|---|---|---|---|
| 1 | Web | ON | abc_cloud.co.jp | home/a | user_a | | 1 |
| 2 | SMB | OFF | ¥¥pc | ¥internal | | pass_a | |
| 3 | Web | ON | abc_cloud.co.jp | home/b | user_b | | 2 |
| 4 | Web | ON | abc_cloud.co.jp | home/c | user_c | | 5 |
| 5 | FTP | OFF | pc.abc.co.jp | home/d | user_d | pass_d | |
| | | | | | | | |

FIG. 9B

USER INFORMATION

| USER ID (482) | USER NAME (483) | PASSWORD (484) | ELECTRONIC MAIL ADDRESS (485) | ACCESS TOKEN ID (486) |
|---|---|---|---|---|
| 1 | user_1 | user111 | user_1@abc.co.jp | 3 |
| 2 | user_2 | 7645321 | user_2@abc.co.jp | 4 |
| 3 | user_3 | 3user | user_3@abc.co.jp | 6 |
| | | | | |

FIG. 9C

ACCESS TOKEN INFORMATION

| ACCESS TOKEN ID (487) | ACCESS TOKEN (488) | EXPIRATION DATE (489) |
|---|---|---|
| 1 | n4hgnfmfgmfPODFmfmmghHfmfSHf | 2016/12/31 |
| 2 | guufdgsdg5y5SDHKt4j5thkjRyDKS | 2016/12/31 |
| 3 | 64YhnfQjhnfFtyoKedMcrthdrtFPh | 2016/12/31 |
| 4 | jkufjkgl87n5e67dfkoyhdssgQEekl | 2016/12/31 |
| 5 | ArthWrhf7tjkuk69dths47shthy23y | 2016/12/31 |
| 6 | YUdhdshiofdj6tYHK5jkH89843hkf0 | 2016/12/31 |

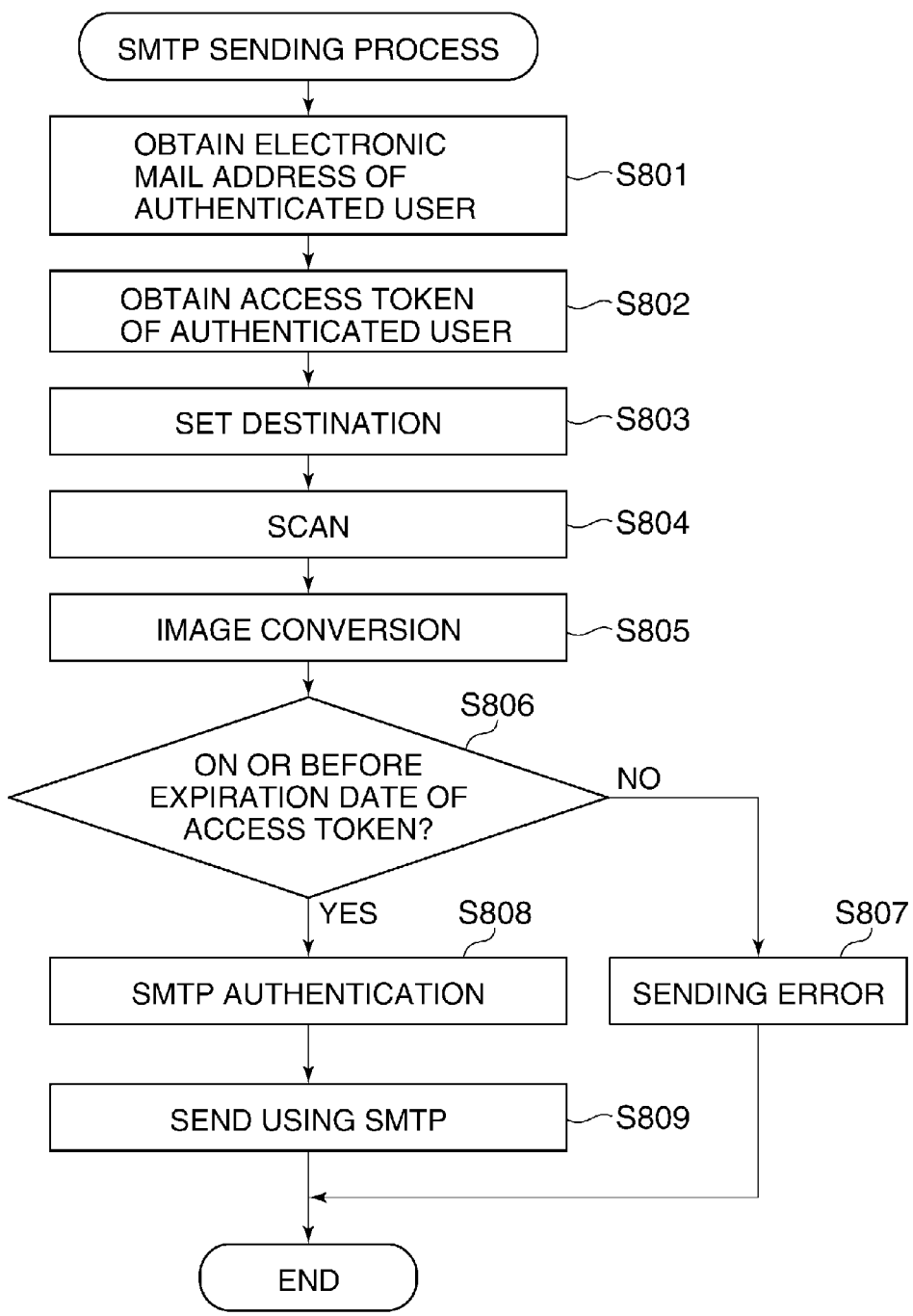

IMAGE FORMING APPARATUS USING CLOUD SERVICES, IMAGE COMMUNICATION METHOD THEREFOR, AND STORAGE MEDIUM

BACKGROUND OF THE INVENTION

Field of the Invention

The present invention relates to an image forming apparatus, an image communication method therefor, and a storage medium, and in particular to an image forming apparatus using cloud services, an image communication method therefor, and a storage medium.

Description of the Related Art

Cloud services which use servers placed in a cloud on the Internet and accessible even from mobile terminals such as cellular phones as well as PCs are becoming widespread.

One of techniques for performing authentication of users who use the cloud services is OAuth 2.0 using access tokens. This technique is registered as RFC 6749 and RFC 6750.

Japanese Laid-Open Patent Publication (Kokai) No. 2015-118533 discloses a technique for printing data on a cloud using an access token. Also, Japanese Laid-Open Patent Publication (Kokai) No. 2014-197819 discloses a technique for sending scanned-in data to a server on a cloud using an access token.

OAuth 2.0 requires opening an authentication screen of an authenticating station using a Web browser and entering a user name and a password to log in to the authenticating station.

For this reason, it has been difficult to use services using OAuth 2.0 with printers and scanners which are not equipped with Web browsers.

To solve this problem, according to Japanese Laid-Open Patent Publication (Kokai) No. 2015-118533 and Japanese Laid-Open Patent Publication (Kokai) No. 2014-197819, a printer or a scanner obtains an access token from a mobile terminal, which in turn communicates with the printer or the scanner using NFC to perform user authentication.

According to Japanese Laid-Open Patent Publication (Kokai) No. 2014-197819, however, it is necessary to place an original on a scanner and then always perform operation on the mobile terminal so as to send image data on the scanned original to a server on the cloud. For this reason, when originals are placed on an original platen glass and scanned in one by one, a user has to go back and forth between the scanner and the mobile terminal, and hence operation is complicated. According to Japanese Laid-Open Patent Publication (Kokai) No. 2015-118533 as well, operation is complicated because the user has to go back and forth between the printer and the mobile terminal each time he or she obtains data to be printed from a cloud.

SUMMARY OF THE INVENTION

The present invention provides an image forming apparatus and an image communication method therefor which eliminate a need for a user to operate a mobile terminal each time he or she sends an image file from the image forming apparatus using a cloud service and therefore enhance ease of operation, as well as a storage medium.

Accordingly, the present invention provides an image forming apparatus comprising a first user authentication unit configured to be used by a user to perform first user authentication for a main body of the image forming apparatus, an image reading unit, a transmission destination setting unit, an image conversion unit configured to convert image data obtained from the image reading unit to an image file, a sending unit configured to send the image file subjected to the conversion by the image conversion unit to a transmission destination set by the transmission destination setting unit, an access token management unit configured to manage at least one access token for using a function of an external server, a selection unit configured to, based on the user authenticated by the first user authentication unit, select an access token to be used from the at least one access token managed by the access token management unit, and a second user authentication unit configured to perform second user authentication for the external server using the selected access token, wherein the sending unit sends the image file using the function of the external server after the second user authentication unit performs the second user authentication.

According to the present invention, a need for a user to operate a mobile terminal each time he or she sends an image file from the image forming apparatus using a cloud service is eliminated, and as a result, ease of operation is enhanced.

Further features of the present invention will become apparent from the following description of exemplary embodiments (with reference to the attached drawings).

BRIEF DESCRIPTION OF THE DRAWINGS

FIG. 5 is a view useful in explaining a file destination setting screen which is displayed on the Web browser.

FIGS. 9A to 9C are diagrams showing databases including access tokens managed in a hard disk of the MFP.

FIG. 10 is a flowchart showing the procedure of an SMTP sending process.

DESCRIPTION OF THE EMBODIMENTS

Hereafter, an embodiment of the present invention will be described with reference to the drawings.

Figure 1:
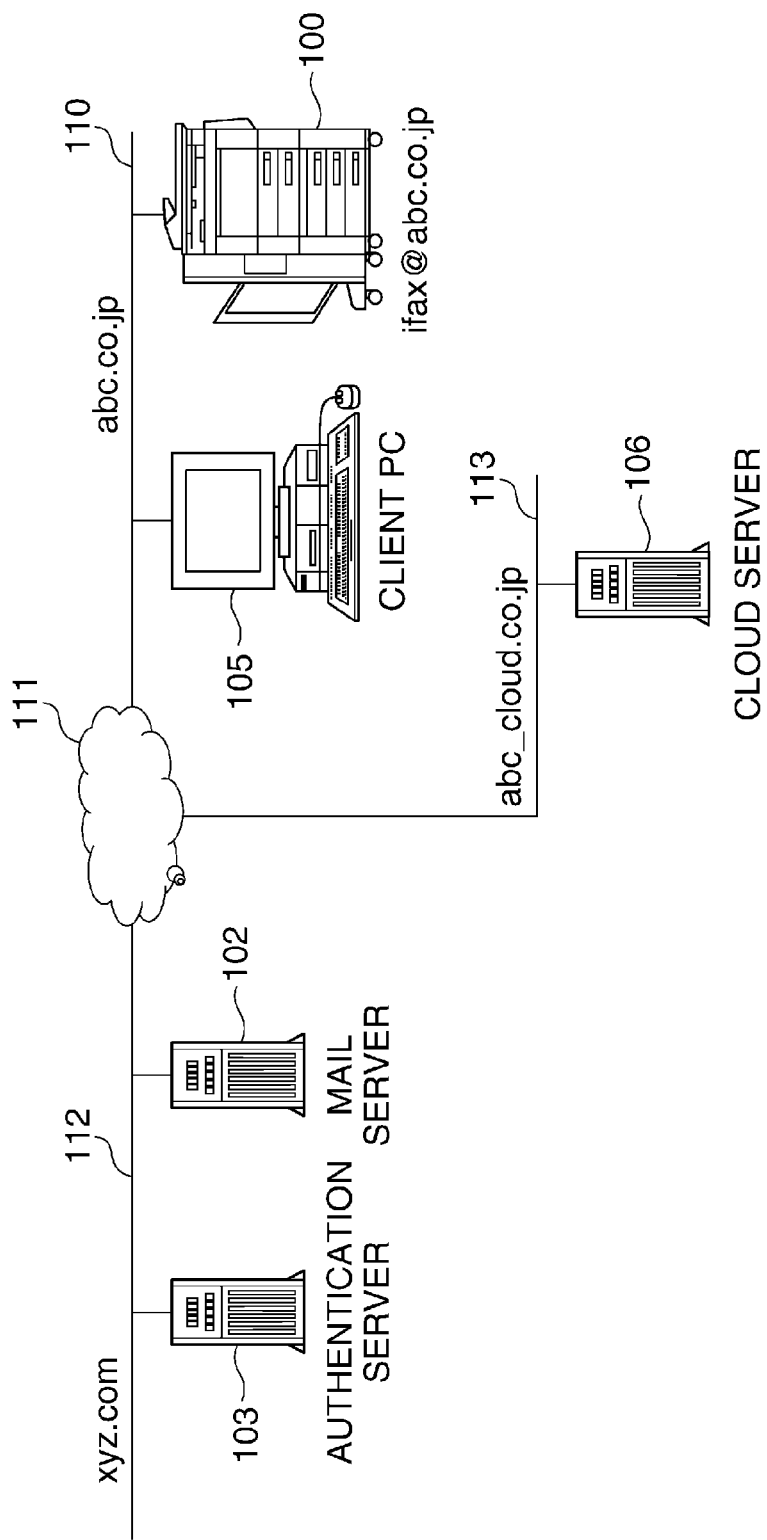
FIG. 1 is a view showing a system arrangement including an MFP which is an image forming apparatus according to an embodiment of the present invention.

FIG. 1 is a view showing a system arrangement including an MFP which is an image forming apparatus according to an embodiment of the present invention.

The MFP 100 is an MFP (multi-function peripheral) which is equipped with a copy function, a FAX function, a printer function, and so forth using an electrophotographic technology and connected to a network line.

The MFP 100 is also equipped with a send function (sending unit) of sending an image file read by a scanner to computer equipment, and an IFAX function of printing an image read by external equipment of the same type using a scanner and received by carrying out a communication.

A network 110, which has a domain name "abc.co.jp", is connected to worldwide networks via the Internet 111.

A network 112, which has a domain name "xyz.co.jp", is connected to the Internet 111. A mail server 102, an authentication server 103, and so forth are placed on the network 112 to form a cloud. A client PC 105 is thus able to utilize a cloud mail function, which is one of cloud services, using SMTP and POP3.

A network 113, which has a domain name "abc_cloud.co.jp", is connected to the Internet 111. A cloud server 106 is placed on the network 113. The cloud server 106 works in coordination with the authentication server 103 to act as a file server on the cloud. This enables the client PC 105 to use a cloud storage function, which is one of the cloud services, by accessing the cloud server 106 using FTP, SMB, Web-DAV, or the like.

Figure 2:
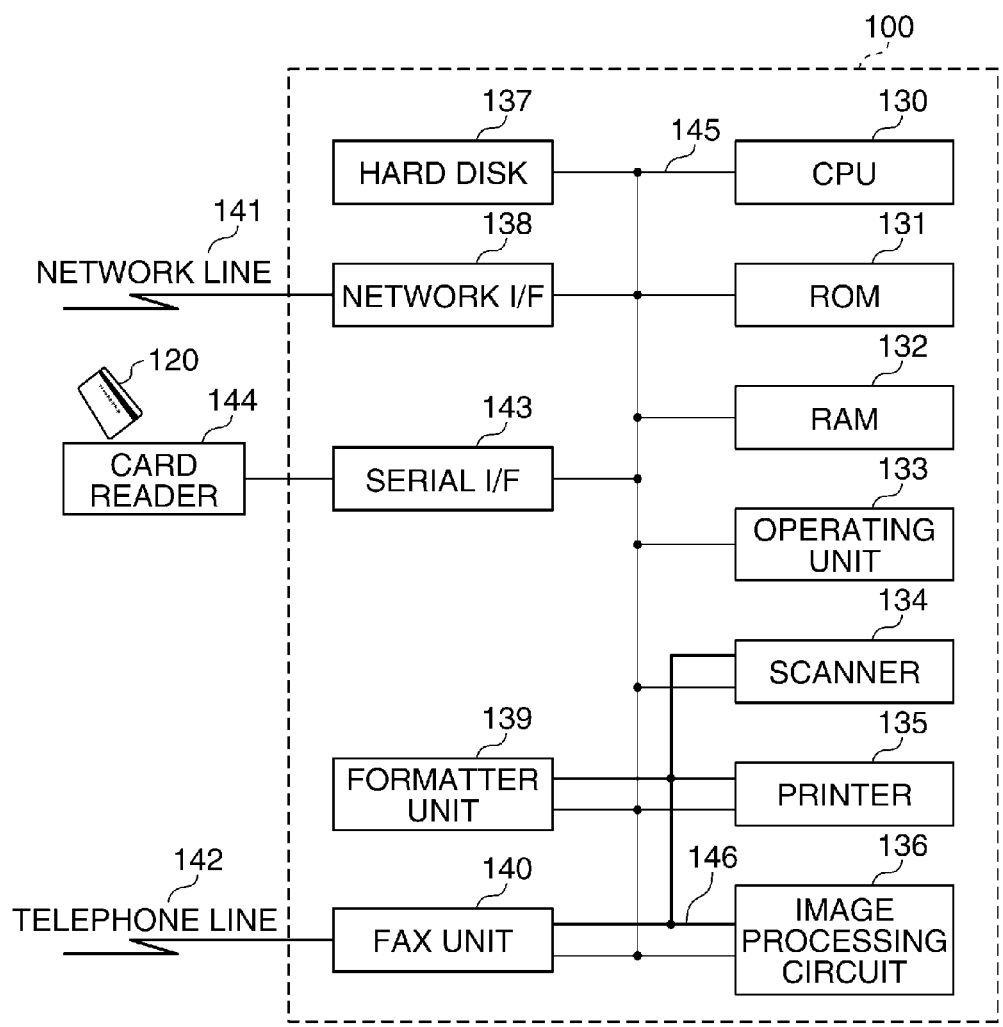
FIG. 2 is a diagram useful in explaining a hardware arrangement of the MFP.

FIG. 2 is a diagram useful in explaining a hardware arrangement of the MFP 100.

Referring to FIG. 2, a CPU 130 is a control circuit which controls the overall system by using programs stored in a ROM 131 and memory of a RAM 132.

An operating unit 133 is a LUI (Local User Interface) circuit comprised of an LCD panel and hardware keys such as a start key and a numeric keypad. The operating unit 133 displays soft buttons on the LCD panel and detects user's touches on the buttons to smoothly perform user operations.

A scanner 134 (image reading unit) reads an image off an original to generate image data. A printer 135 prints an image based on the image data on a recording medium.

An image processing circuit 136 (image conversion unit) is comprised of a large-capacity image memory, an image rotation circuit, a resolution changing circuit, a coding-encoding circuit, which conforms to MH, MR, MMR, JBIG, JPEG, etc., and so forth. The image processing circuit 136 is thus able to perform a variety of image processing such as shading, trimming, and masking. The image processing circuit 136 also creates image files in such file formats as JPEG, PDF, and TIFF from image data read by the scanner 134.

A hard disk 137 (access token management unit), which is a large-capacity recording medium connected via an I/F conforming to SCSI, IDE, or the like, holds and manages a variety of databases shown in FIGS. 9A to 9C, to be described later.

A network I/F 138 is a circuit for connecting with a network such as an Ethernet (registered trademark) network typified by 10BASE-T and 100BASE-T networks, or a token ring network.

A formatter unit 139 is a rendering circuit which creates image data which is to be printed by the printer 135. When PDL (page-description language) data is received from the client PC 105 via the network I/F 138, the formatter unit 139 creates image data from the received PDL data. The created image data is then subjected to image processing by the image processing circuit 136 and printed by the printer 135.

The scanner 134, the printer 135, the image processing circuit 136, and the formatter unit 139 are connected not only to a CPU bus 145, which is for connecting to the CPU 130, but also to a high-speed video bus 146 so as to transfer image data at high speed. This implements a high-speed copy function of subjecting image data read by the scanner 134 to image processing by the image processing circuit 136 and then printing the image data using the printer 135.

A fax unit 140 controls facsimile communications with an external apparatus on a telephone line 142. The fax unit 140 as well is connected not only to the CPU bus 145 but also to the high-speed video bus 146. This implements a high-speed fax sending function of subjecting image data read by the scanner 134 to image processing by the image processing circuit 136 and then sending the image data from the fax unit 140 to the external apparatus via the telephone line 142. Likewise, a high-speed fax receiving function of receiving data from the external apparatus using the fax unit 140, subjecting the image data to image processing by the image processing circuit 136, and then printing the image data using the printer 135 is implemented as well.

The CPU 130 has a file sending function of sending an image file in PDF created by the image processing circuit 136 from the network I/F 138 using a communication protocol such as SMTP, FTP, SMB, or WebDAV. The file sending function is used for fax transmission, electronic mail transmission, internet facsimile (IFAX) transmission, and fax transmission.

To send an electronic mail using the file sending function, the CPU 130 sends an image file in JPEG, PDF, TIFF, or the like, which is created by the image processing circuit 136, using SMTP. To send a file using the file sending function, the CPU 130 sends the image file using FTP, SMB, or WebDAV.

The IFAX transmission is an image communication method defined by RFC 2305 and implements a facsimile function through transmission and reception of an image file attached to an electronic mail between devices of the same type. At the time of IFAX transmission using the file sending function, the CPU 130 reads image data using the scanner 134, creates a TIFF file defined by RFC 3949 from the read image data using the image processing circuit 136, and sends the TIFF file using SMTP. The CPU 130 has an IFAX receiving function as well. At the time of IFAX reception using the IFAX receiving function, first, the CPU 130 receives an electronic mail with a TIFF file attached thereto using an SMTP or POP function. Next, the TIFF file is changed to an image in an internal image format by the image processing circuit 136 and then subjected to printing by the printer 135.

At the time of FAX transmission using the file sending function, the CPU 130 connects to the telephone line 142 using the fax unit 140 and sends a G3 fax.

A serial I/F 143, which conforms to RS-232C or the like, is for connecting external serial equipment to the MFP 100. In the present embodiment, a card reader 144 (first user authentication unit) is connected to the serial I/F 143. When a card 120 is placed on the card reader 144, and information recorded in the card 120 is read, the CPU 130 obtains the read card information via the serial I/F 143. As a result, the CPU 130 performs user authentication for a main body of the MFP 100.

The CPU 130 also has an HTTP server function and a RUI (Remote User Interface) function of configuring various settings on the MFP 100 and remotely checking a status of the MFP 100 from the client PC 105 at a remote location.

Figure 3:
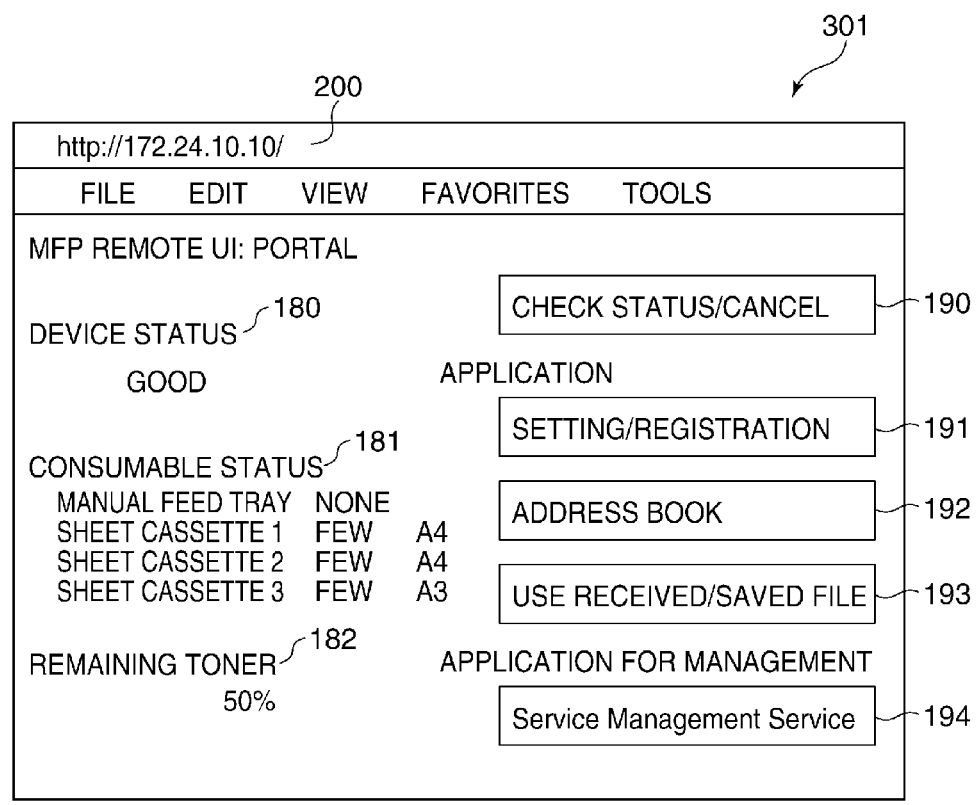
FIG. 3 is a view useful in explaining a top screen which is displayed on a Web browser of a client PC in FIG. 1 when a RUI function of the MFP is accessed.

FIG. 3 is a view useful in explaining a top screen which is displayed on a Web browser of the client PC 105 when the RUI function of the MFP 100 is accessed.

Referring to FIG. 3, the top screen 301 is displayed on the Web browser of the client PC 105 (hereafter referred to merely as the Web browser) when user authentication for accessing the RUI function of the MFP 100 is completed.

Specifically, the user authentication for accessing the RUI function of the MFP 100 is performed as described hereafter. First, when a URL "http://172.24.10.10" is entered in a URL input area 200 of the Web browser, the client PC 105 connects to the MFP 100. Here, "172.24.10.10" is IP address information on the MFP 100, but a host name may be entered in place of the IP address information on the MFP 100. When connection between the client PC 105 and the MFP 100 has successfully been established, a user authentication screen (not shown) is displayed on the Web browser. When a correct user name and a correct password are entered on the user authentication screen, the user authentication is completed, and the top screen 301 in FIG. 3 is displayed.

Referring to FIG. 3, an area 180 shows a status of the MFP 100, and an area 181 shows a status of consumables in the MFP 100, that is, printing sheets in sheet cassettes, no shown, which the printer 135 has. An area 182 shows a remaining amount of toner in the printer 135 of the MFP 100.

Selecting a button 190 enables checking of a status and history of a job running on the MFP 100. During the checking, the running job is allowed to be suspended.

Selecting a button 191 display a screen, on which various settings on and registration of programs running on the MFP 100 are made. When SMTP authentication setting is selected on the displayed screen, an SMTP authentication setting screen 302 in FIG. 4, to be described later, is displayed.

Selecting a button 192 displays a screen (not shown) on which data on an address book in FIG. 9A, to be described later, can be edited. When a file destination which is a new destination is selected on the displayed screen, a file destination setting screen 303 in FIG. 5, to be described later, is displayed.

Selecting a button 193 displays a received/saved file to be used. Here, a received file means a box in which PDL images received by the network I/F 138 via the network 110, images received by the fax unit 140 via the telephone line 142, and so forth are saved as a file. A saved file means a box in which images read by the scanner 134 are saved as a file.

Selecting a button 194 opens a screen, not shown, on which a license and others are managed.

The URL input area 200 is an area where a URL to be accessed by the Web browser is entered and displayed. In FIG. 3, the IP address information on the MFP 100 is included in the URL.

Figure 4:
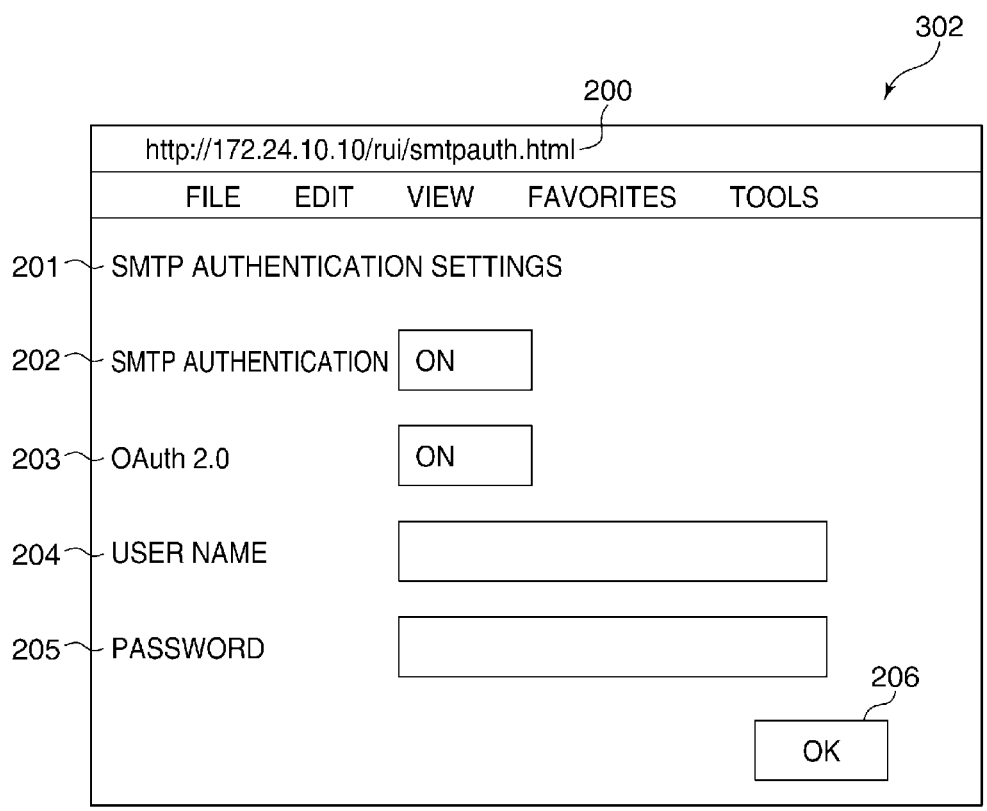
FIG. 4 is a view useful in explaining an SMTP authentication setting screen which is displayed on the Web browser.

FIG. 4 is a view useful in explaining the SMTP authentication setting screen 302 which is displayed on the Web browser.

As described earlier, the SMTP authentication setting screen 302 is displayed when SMTP authentication setting is selected on the screen, not shown, displayed by selecting the button 191 on the top screen 301 in FIG. 3.

The SMTP authentication setting screen 302 has an area 201, an SMTP authentication area 202, an OAuth 2.0 area 203, areas 204 and 205, and an OK key 206.

Selecting a button in the SMTP authentication area 202 makes a setting as to whether or not to perform SMTP authentication and perform transmission.

Selection of a button in the OAuth 2.0 area 203 makes a setting as to whether or not to follow a method defined by RFC 6749 or RFC 6750 as an authentication method for SMTP authentication (ON/OFF).

The area 204 is an area where an authentication user name for SMTP authentication is entered, and the area 205 is an area where a password for the user name is entered.

Selecting the OK key 206 registers the settings made in the areas 201 to 205.

It should be noted that the SMTP authentication setting screen 302 is a screen where settings are made for each authenticated user of the MFP 100, but SMTP authentication settings for the MFP 100 as a device may be configured on the SMTP authentication setting screen 302. When an authenticated user sends an electronic mail using his or her electronic mail address, settings for the authenticated user are used. On the other hand, when an image received by the fax unit 140 is automatically attached to an electronic mail and forwarded, SMTP settings for the MFP 100 as the device are used.

FIG. 5 is a view useful in explaining the file destination setting screen 303 which is displayed on the Web browser.

The file destination setting screen 303 is displayed when a file destination which is a new destination is selected on the screen, not shown, displayed by selecting the button 192 on the top screen 301 in FIG. 3 as described earlier.

The file destination setting screen 303 has an area 210, a protocol designation area 211, an OAuth 2.0 area 212, areas 213 to 216, and an OK key 217.

The protocol designation area 211 is an area where a communication protocol to be used for a transmission destination is designated, and one of SMB, FTP, and Web (WebDAV) is designated by operating a button in this area.

The OAuth 2.0 area 212 is an area where a setting is made as to whether or not to follow a method defined by RFC 6749 or RFC 6750 as an authentication method for WebDAV transmission (ON/OFF). This setting is made by selecting a button in the OAuth 2.0 area 212.

The area 213 is an area where a host name of the transmission destination is entered, and the area 214 is an area where a path to a folder (folder path) where a file is to be stored is entered.

The area 215 is an area where a user name of a user who owns the folder identified by the folder path entered in the area 214 is entered, and the area 216 is an area where a password for the user name is entered.

Selecting the OK key 217 registers the settings made in the areas 211 to 216.

Figure 6:
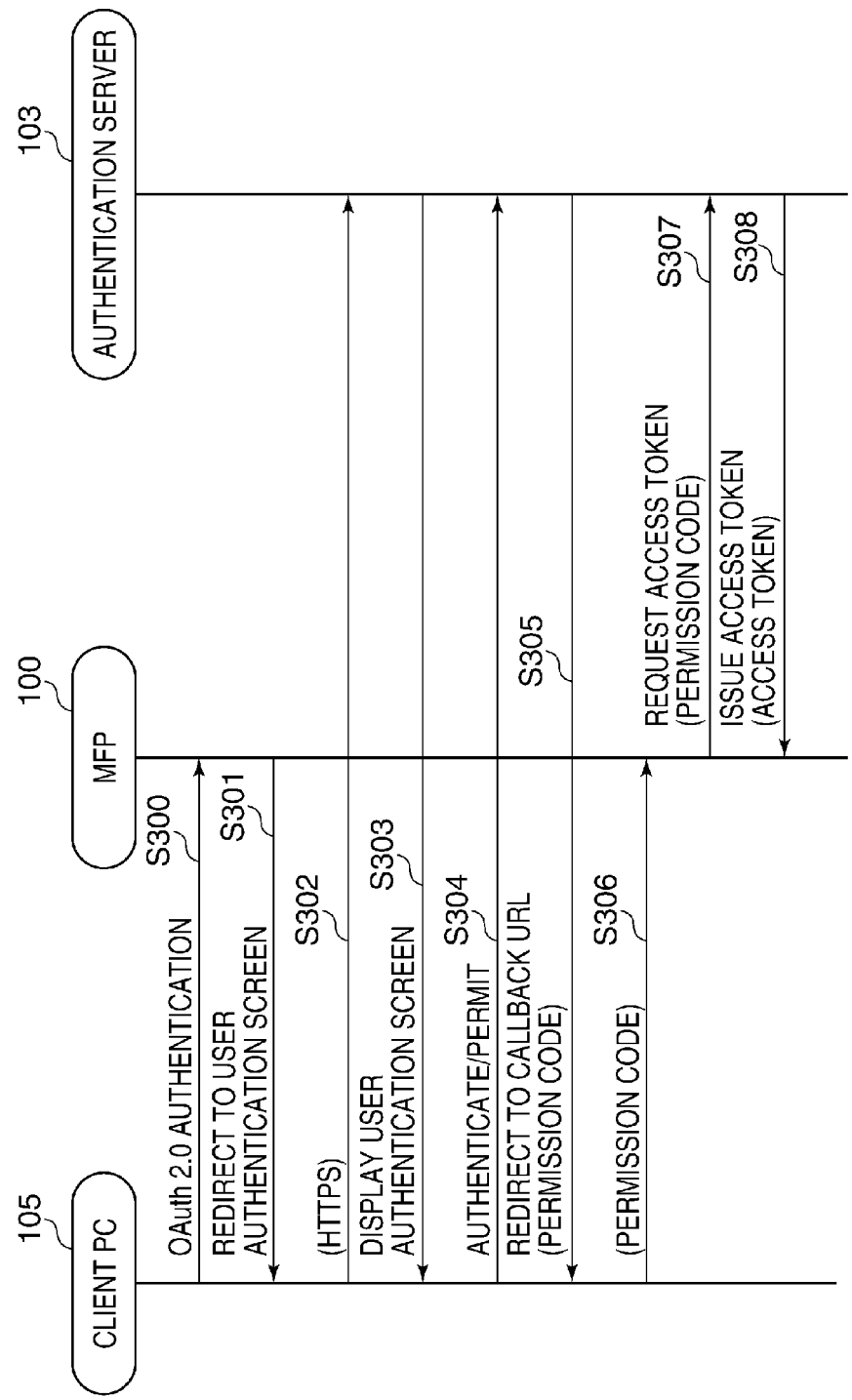
FIG. 6 is a sequence diagram showing the procedure of an access token obtaining process using the RUI function of the MFP.

FIG. 6 is a sequence diagram showing the procedure of an access token obtaining process using the RUI function of the MFP 100.

Referring to FIG. 6, first, when the user selects the OK key 206 in FIG. 4 or the OK key 217 in FIG. 5, OAuth 2.0 authentication is started for the MFP 100 by the client PC 105 (step S300). The authentication process is carried out when ON is selected in the OAuth 2.0 area 203 in FIG. 4 or the OAuth 2.0 area 212 in FIG. 5.

During the OAuth 2.0 authentication, when it is judged that the client PC 105 is registered in the MFP 100, the CPU 130 of the MFP 100 performs the RUI function and instructs the client PC 105 to redirect the Web browser to the user authentication screen (not shown) for the authentication server 103 (step S301).

In accordance with the instruction in the step S301, the client PC 105 accesses the authentication server 103 using HTTPS (step S302). As a result, the client PC 105 obtains HTML data on the user authentication screen from the authentication server 103, and based on the HTML data, displays the user authentication screen on the Web browser (step S303).

After that, whether or not user authentication has been successfully performed between the client PC 105 and the authentication server 103 and whether or not to allow usage of a cloud service function are determined (step S304).

Specifically, the process in the step S304 is carried out as described hereafter.

First, whether or not the user authentication has been successfully performed between the client PC 105 and the authentication server 103 is determined based on the user authentication screen displayed on the Web browser in the step S303. As a result of the determination, when the user authentication has been successfully performed, the authentication server 103 inquires of the authenticated user about whether or not to permit usage of the cloud service function for which function settings have been made on the screen in FIG. 4 or FIG. 5. The inquiry is made by displaying, on the Web browser, an inquiry screen for inquiry about permission to use the cloud mail function when the present process was started by selecting the key 206 in FIG. 4. On the other hand, when the present process was started by selecting the OK key 217 in FIG. 5, the inquiry is made by displaying, on the Web browser, an inquiry screen for inquiry about permission to use the cloud storage function. When the user chooses to give permission on either of the above inquiry screens, the inquiry about whether or not to permit usage of the cloud service function by the client PC 105 to the authentication server 103 is completed, and the process proceeds to step S305.

In the step S305, the authentication server 103 sends a permission code to the client PC 105 and also leads the client PC 105 to redirect to a callback URL. As a result, the client PC 105 operates to pass the permission code obtained in the step S305 to the MFP 100 (step S306).

Then, upon receiving the permission code from the client PC 105, the MFP 100 issues an access token request command with the permission code attached thereto to the authentication server 103 (step S307).

The authentication server 103 receives the command issued by the MFP 100 in the step S307, validates the authenticity of the permission code attached to the command, and then issues an access token to the MFP 100 (step S308).

Figure 7:
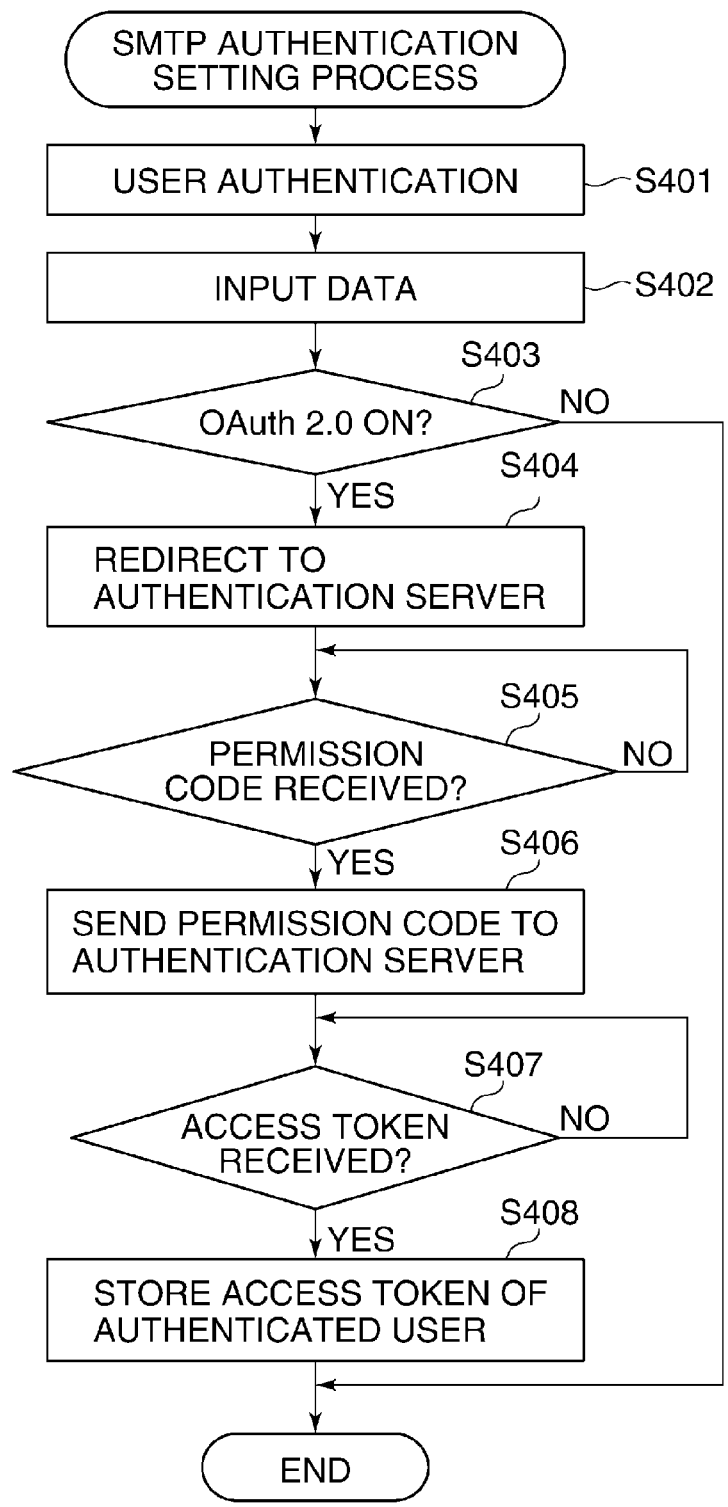
FIG. 7 is a flowchart showing the procedure of an SMTP authentication setting process.

FIG. 7 is a flowchart showing the procedure of an SMTP authentication setting process. This process is implemented by the CPU 130 of the MFP 100 executing a program stored in the ROM 131.

In response to an access from the client PC 105, the CPU 130 performs user authentication for accessing the RUI function of the MFP 100 (step S3401). It should be noted that the user authentication may be skipped as long as it has been performed prior to the present process.

When the user authentication in the step S401 is successful, the CPU 130 sends screen data for displaying the top screen 301 in FIG. 3 to the client PC 105. Based on the screen data, the client PC 105 displays the top screen 301 in FIG. 3 on the display unit (the Web browser) of the client PC 105. After that, when SMTP authentication setting is selected on the screen displayed by selecting the button 191 on the top screen 301, the CPU 130 sends screen data for displaying the SMTP authentication setting screen 302 in FIG. 4 to the client PC 105. Based on the screen data, the client PC 105 displays the SMTP authentication setting screen 302 in FIG. 4 on the Web browser. When the user inputs required items (data) and selects the OK key 206 on the SMTP authentication setting screen 302, the client PC 105 sends the data input by the user to the MFP 100. The CPU 130 receives the data sent from the client PC 105 (step S402).

The CPU 130 then analyzes the received data and determines whether or not OAuth 2.0 is set to ON in the OAuth 2.0 area 203 (step S403). As a result of the determination, when OAuth 2.0 is not set to ON, the present process is ended without further processing, and when OAuth 2.0 is set to ON, the process proceeds to step S404.

In the step S404, the CPU 130 redirects to the authentication server 103. As a result, the client PC 105 accesses the authentication server 103 and displays, first, the user authentication screen (not shown) for the authentication server 103 on the Web browser. When user authentication has been successfully performed on the user authentication screen, an inquiry screen (not shown) for inquiry about permission to use the cloud mail function is displayed on the Web browser of the client PC 105. When the user chooses to give permission on the inquiry screen for inquiry about permission to use the cloud mail function, the authentication server 103 sends a permission code to the client PC 105.

Then, upon receiving the permission code from the client PC 105 (YES in step S405), the CPU 130 sends the permission code to the authentication server 103 (step S406).

After that, upon receiving an access token from the authentication server 103 (YES in step S407), the CPU 130 stores, in the hard disk 137 of the MFP 100, the received access token as an access token of the authenticated user (step S408). The CPU 130 then ends the present process.

Figure 8:
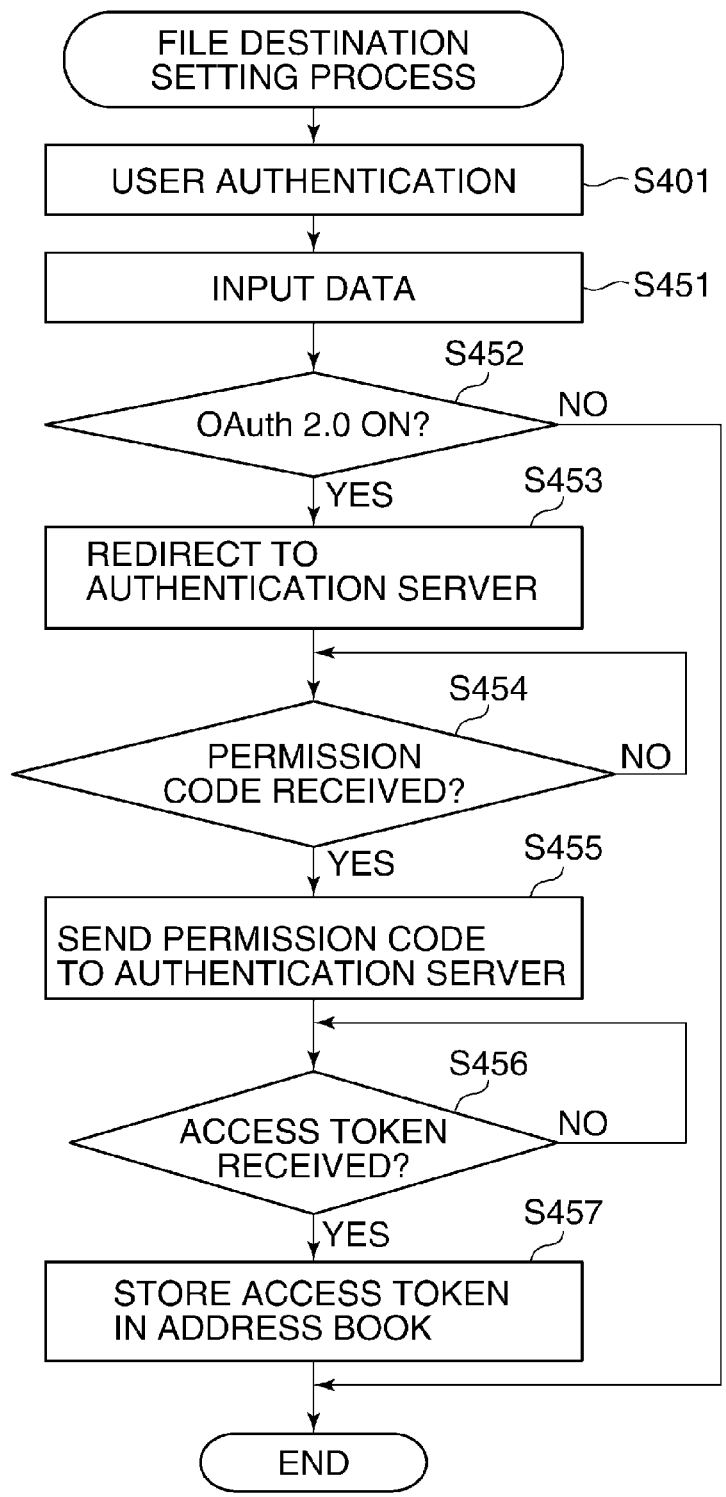
FIG. 8 is a flowchart showing the procedure of a file destination setting process.

FIG. 8 is a flowchart showing the procedure of a file destination setting process. This process is implemented by the CPU 130 of the MFP 100 executing a program stored in the ROM 131.

First, in response to an access from the client PC 105, the CPU 130 performs user authentication for accessing the RUI function of the MFP 100 (step S401). The user authentication may be skipped as long as it has been performed prior to the present process as with the case of FIG. 7.

When the user authentication in the step S401 is successful, the CPU 130 sends screen data for displaying the top screen 301 in FIG. 3 to the client PC 105. Based on the screen data, the client PC 105 displays the top screen 301 in FIG. 3 on the Web browser. After that, when a file destination which is a new destination is selected on the screen displayed by selecting the button 192 on the top screen 301, the CPU 130 sends screen data for displaying the file destination setting screen 303 in FIG. 5 to the client PC 105. Based on the screen data, the client PC 105 displays the file destination setting screen 303 in FIG. 5 on the Web browser. When the user inputs required items (data) including the file destination and selects the OK key 217 on the file destination setting screen 303, the client PC 105 sends the data input by the user to the MFP 100. The CPU 130 receives the data sent from the client PC 105 (step S451).

The CPU 130 then analyzes the received data and determines whether or not OAuth 2.0 is set to ON in the OAuth 2.0 area 212 (step S452). As a result of the determination, when OAuth 2.0 is not set to ON, the present process is ended without further processing, and when OAuth 2.0 is set to ON, the process proceeds to step S453.

In the step S453, the CPU 130 redirects to the authentication server 103. As a result, the client PC 105 accesses the authentication server 103 and displays, first, the user authentication screen (not shown) for the authentication server 103 on the Web browser. When user authentication has been successfully performed on the user authentication screen, an inquiry screen (not shown) for inquiry about permission to use the cloud storage function is displayed on the Web browser of the client PC 105. When the user chooses to give permission on the usage on the inquiry screen for inquiry about permission to use the cloud storage function, the authentication server 103 sends a permission code to the client PC 105.

Then, upon receiving the permission code from the client PC 105 (YES in step S454), the CPU 130 sends the permission code to the authentication server 103 (step S455).

After that, upon receiving an access token from the authentication server 103 (YES in step S456), the CPU 130 stores, in the hard disk 137 of the MFP 100, the received access token as an access token of the file destination input in the step S451 (step S457). The CPU 130 then ends the present process.

FIGS. 9A to 9C are diagrams showing databases including access tokens managed in the hard disk 137 of the MFP 100.

As described hereafter, access tokens obtained in the step S308 in FIG. 6 are managed as address book information, user information, and access token information on the MFP 100.

FIG. 9A shows a database on an address book.

The address book is a database in which transmission destinations are managed, and as indicated in an address index ID column 480, unique numbers are assigned as index IDs to respective destinations.

The database on the address book has columns described below as well as the address index ID column 480.

First, protocols designated in the protocol designation area 211 of the file destination setting screen 303 in FIG. 5 are registered in a protocol column 231. ON/OFF settings made in the OAuth 1.0 area 212 in FIG. 5 are registered in an OAuth ON/OFF column 232. Likewise, data on host names, folder paths, user names, and passwords entered in the areas 213 to 216 in FIG. 5 is registered in columns 233 to 236, respectively.

In columns 487 and 488 of access token information, to be described later with reference to FIG. 9C, access tokens issued in the step S308 are managed in a state of having respective unique numbers assigned thereto as access token IDs. In the address book, only those access token IDs are registered in the column 481.

For example, in a file transmission process in FIG. 11, to be describe later, when a destination (folder path) indicated by an index ID "3" of the address book is selected as a file transmission destination, an access token ID is "2". In this case, when a file is to be sent to the file transmission destination using the cloud storage function, a character string "guufdgsdg5y5SDHKt4j5thkjRyDKS" is obtained as an access token of the file transmission destination by referring to FIG. 9C.

It should be noted that although the databases in FIGS. 9A to 9C are registered in the hard disk 137, a variety of information including access tokens in the databases is recorded in encrypted form. This prevents the information from being obtained from the hard disk 137 when it is removed from the MFP 100, and access tokens of file destinations are managed securely in a state of being linked to data in the address book.

FIG. 9B shows a database on user information in which users allowed to use the MFP 100 are registered.

The database in FIG. 9B is registered when an administrator or a user registers in advance (for example, at the time of MFP installation) information on users who use the MFP 100. It should be noted that as for registration of electronic mail addresses, if the MFP 100 works in coordination with Active Directory for Windows or the like, electronic mails of authenticated users may be obtained from Active Directory.

As indicated in the user ID column 482, user IDs which are unique numbers are assigned to respective users allowed to use the cloud mail function.

The database on the user information has columns 483 to 486 as well as the user ID column 482.

In the columns 483 to 486, data on user names and passwords entered in the areas 204 and 205 in FIG. 4 are registered.

In the column 485, electronic mail addresses of respective users are registered.

In a column 487 of the database on access token information, to be described later with reference to FIG. 9C, unique numbers (access token IDs) are assigned to respective access tokens issued in the step S308. Thus, the access tokens themselves are not registered in the user information, but only their access token IDs are registered in the column 486.

For example, when a user ID of a user who has logged in is "2", an access token ID of the user is "4". In this case, when an electronic mail is to be sent to a predetermined transmission destination using the cloud mail function, a character string "jkufjkgl87n5e67dfkoyhdssgQEekl" is obtained as an access token of the transmission destination by referring to FIG. 9C.

Although in the present embodiment, the user information managed as the database in FIG. 9B is stored in the hard disk 137 of the MFP 100, it should not necessarily be stored in the hard disk 137. For example, the user information managed as the database in FIG. 9B may be stored in an external server or a server on a cloud. The database in FIG. 9B may not be integrally managed but may be divided into data pieces and individually managed.

FIG. 10 is a flowchart showing the procedure of an SMTP sending process. In this process, image data scanned off an original by the scanner 134 is attached to an electronic mail and sent to a predetermined transmission destination (electronic mail address) using the cloud mail function. This process is implemented by the CPU 130 of the MFP 100 executing a program stored in the ROM 131.

To start the process, first, the user places an original on a feeder of the scanner 134, brings the card 120 close to the card reader 144, and waits for the user to be authenticated. When the user is authenticated, the CPU 130 displays a transmission setting screen, not shown, on which one of File, Mail, IFAX, and FAX is allowed to be set as an image communication method is displayed on the operating unit 133 of the MFP 100. When the user selects "Mail" on the transmission setting screen, the CPU 130 starts processes in step S801 and the subsequent steps.

First, the CPU 130 obtains an electronic mail address of the authenticated user from the column 485 of the database on the user information in FIG. 9B (step S801). Thus, the electronic mail address which is a transmission source of SMTP transmission in step S809, to be described later, is set.

Next, the CPU 130 obtains an access token ID of the authenticated user from the column 486 of the database on the user information in FIG. 9B. Then, the CPU 130 obtains an access token corresponding to the obtained access token ID from the column 488 of the database on the access token information in FIG. 9C (step 3802; selection unit).

After that, when the electronic mail address entered on the transmission setting screen by the user using the operating unit 133 is set as the transmission destination (step S803; transmission destination setting unit), the CPU 130 causes the scanner 134 to read the original placed by the user (step 3804). In the step 3804, the image processing circuit 136 subjects data on the read original to image conversion so that the data can be converted into a file format designated by the user (step S805).

Then, when the access token obtained in the step S802 has an expiration date, the CPU 130 determines whether or not the expiration date has passed (step S806). As a result of the determination, when the expiration date has passed, the CPU 130 determines that a transmission error has occurred (step S807) and ends the present process. On the other hand, as a result of the determination in the step S806, when the expiration date has not passed, the CPU 130 performs SMTP authentication for the mail server 102 using the obtained access token (step S808; second user authentication unit). The CPU 130 then attaches the file subjected to the image conversion to an electronic mail and sends them using SMTP (step S809) and ends the present process. Specifically, in the step S809, the electronic mail with the file subjected to the image conversion in the step S805 attached thereto is sent to the electronic mail address selected in the step S803.

Figure 11:
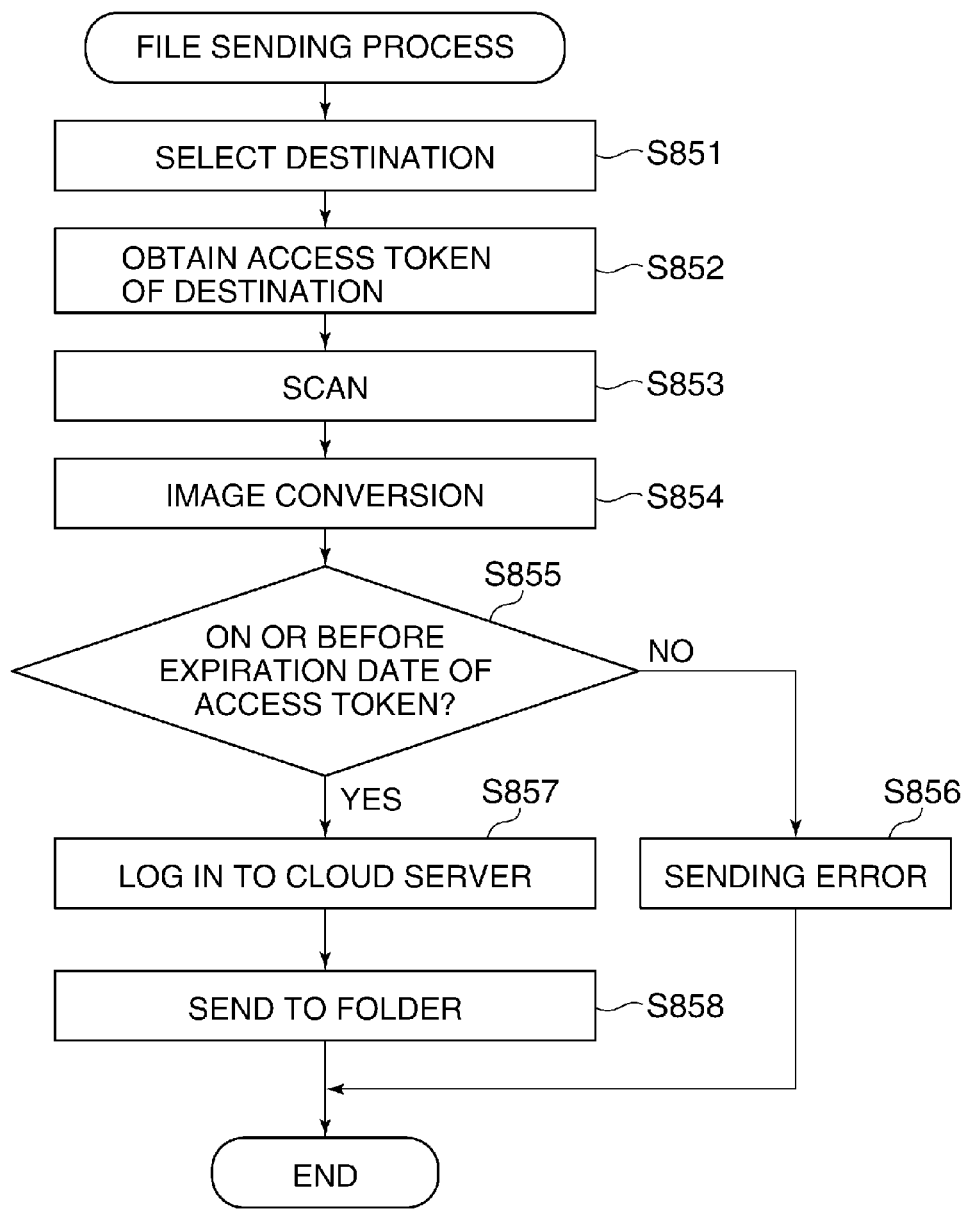
FIG. 11 is a flowchart showing the procedure of a file sending process.

FIG. 11 is a flowchart showing the procedure of a file sending process. In this process, image data on an original scanned by the scanner 134 is converted into a predetermined file format and sent to a predetermined storage destination (folder path) using the cloud storage function. This process is implemented by the CPU 130 of the MFP 100 executing a program stored in the ROM 131.

To start the process, first, the user places an original on the feeder of the scanner 134, brings the card 120 close to the card reader 144, and waits for the user to be authenticated. When the user is authenticated, the CPU 130 displays the transmission setting screen, not shown, described above with reference to FIG. 10 on the operating unit 133 of the MFP 100, and when the user selects "File" as the image communication method on the transmission setting screen, the CPU 130 starts the present process. It should be noted that in the present embodiment, the file sending process requires the user to be authenticated by placing the card 120 on the card reader 144 as with the SMTP sending process. However, the user authentication may be skipped in the file sending process. For example, when the user places an original on the feeder of the scanner 134, the process may directly proceed to step S851, to be described below.

First, the CPU 130 displays the database on the address book in FIG. 9A on the operating unit 133. Next, the CPU 130 waits for the user to select a file transmission destination from the address book being displayed based on a user name of a user, who owns a folder, and a folder path (step S851). When the file transmission destination is selected, the CPU 130 obtains an access token ID corresponding to the selected file transmission destination. The CPU 130 also obtains an access token corresponding to the obtained access token ID from the column 488 of the database on the access token information in FIG. as an access token of the transmission destination (step S852; selection unit).

After that, the CPU 130 causes the scanner 134 to read the original placed by the user (step S853) Then, the image processing circuit 136 subjects data on the original read in the step S853 to image conversion so that the data can be converted into a file format designated by the user (step S854).

After that, when the access token obtained in the step S852 has an expiration date, the CPU 130 determines whether or not the expiration date has passed (step S855). As a result of the determination, when the expiration date has passed, the CPU 130 determines that a transmission error has occurred (step S856) and ends the present process. On the other hand, as a result of the determination in the step S855, when the expiration date has not passed, the CPU 130 carries out a process for logging in to the cloud server 106 using the obtained access token (step S857). The CPU 130 then sends the file subjected to the image conversion in the step S854 to the folder corresponding to the user name selected as the destination in the step S851 using HTTP (step S858) and ends the present process. The transmission in the step S858 is performed according to the folder path designated in the column 234 in FIG. 9A.

Other Embodiments

Embodiment(s) of the present invention can also be realized by a computer of a system or apparatus that reads out and executes computer executable instructions (e.g., one or more programs) recorded on a storage medium (which may also be referred to more fully as a 'non-transitory computer-readable storage medium') to perform the functions of one or more of the above-described embodiment(s) and/or that includes one or more circuits (e.g., application specific integrated circuit (ASIC)) for performing the functions of one or more of the above-described embodiment(s), and by a method performed by the computer of the system or apparatus by, for example, reading out and executing the computer executable instructions from the storage medium to perform the functions of one or more of the above-described embodiment(s) and/or controlling the one or more circuits to perform the functions of one or more of the above-described embodiment(s). The computer may comprise one or more processors (e.g., central processing unit (CPU), micro processing unit (MPU)) and may include a network of separate computers or separate processors to read out and execute the computer executable instructions. The computer executable instructions may be provided to the computer, for example, from a network or the storage medium. The storage medium may include, for example, one or more of a hard disk, a random-access memory (RAM), a read only memory (ROM), a storage of distributed computing systems, an optical disk (such as a compact disc (CD), digital versatile disc (DVD), or Blu-ray Disc (BD)™), a flash memory device, a memory card, and the like.

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application No. 2016-189767, filed Sep. 28, 2016 which is hereby incorporated by reference herein in its entirety.

What is claimed is:

1. An image forming apparatus that performs user authentication for a main body of the image forming apparatus, the image forming apparatus comprising:
   a scanner;
   a memory that stores instructions; and
   a processor that executes the instructions to cause the image forming apparatus to:
      manage at least one access token for using a function of an external server in association with each user authenticated by the user authentication for the main body of the image forming apparatus, wherein each access token is issued for each user authenticated by an authentication server different from the external server;

select an access token corresponding to a result of the user authentication for the main body of the image forming apparatus;

perform a conversion to convert image data obtained from the scanner to an image file; and send, using the function of the external server according to the selected access token, the image file subjected to the conversion to a transmission destination.

2. The image forming apparatus according to claim 1, wherein the image file is sent to the transmission destination by an electronic mail.

3. The image forming apparatus according to claim 1, wherein the function of the external server is a cloud mail function.

4. The image forming apparatus according to claim 1, wherein the image file is not sent when an expiration date of the selected access token has passed.

5. The image forming apparatus according to claim 1, wherein the at least one access token is managed in encrypted form in a recording medium.

6. The image forming apparatus according to claim 1, wherein the at least one access token is managed in association with each user authenticated by the user authentication for the main body to perform a process corresponding to a Simple Mail Transfer Protocol (SMTP) authentication.

7. The image forming apparatus according to claim 6, wherein the processor executes further instructions to cause the image forming apparatus to:

manage an access token for using a function of another external server in association with a predetermined destination included in an address book for a transmission of an image file by using a protocol different from the SMTP;

obtain the managed access token when the predetermined destination is selected from the address book as a transmission destination;

perform a conversion to convert image data obtained from the scanner to an image file; and send, using the function of the another external server according to the obtained access token, the image file subjected to the conversion to the transmission destination.

8. A non-transitory computer-readable storage medium storing a program for causing a computer to execute an image communication method for an image forming apparatus that performs user authentication for a main body of the image forming apparatus, the image forming apparatus including a scanner, the image communication method comprising:

managing at least one access token for using a function of an external server in association with each user authenticated by the user authentication for the main body of the image forming apparatus, wherein each access token is issued for each user authenticated by an authentication server different from the external server;

selecting an access token corresponding to a result of the user authentication for the main body of the image forming apparatus;

performing a conversion to convert image data obtained from the scanner to an image file; and sending the image file, using the function of the external server according to the selected access token, to a transmission destination.

9. An image communication method for an image forming apparatus for performing user authentication for a main body of the image forming apparatus, the image communication method comprising:

managing at least one access token for using a function of an external server, wherein each access token is issued for each user authenticated by an authentication server different from the external server;

selecting an access token corresponding to a result of the user authentication for the main body of the image forming apparatus;

performing conversion for converting image data obtained from a scanner of the image forming apparatus to an image file; and sending, using the function of the external server according to the selected the access token, the image file subjected to the conversion to a transmission destination.

* * * * *